W. Hunt,
Making Cut Nails,
No. 1,407. Patented Nov. 12, 1839
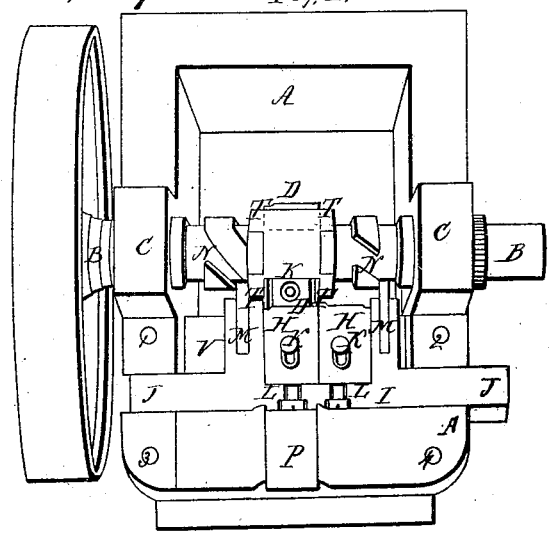
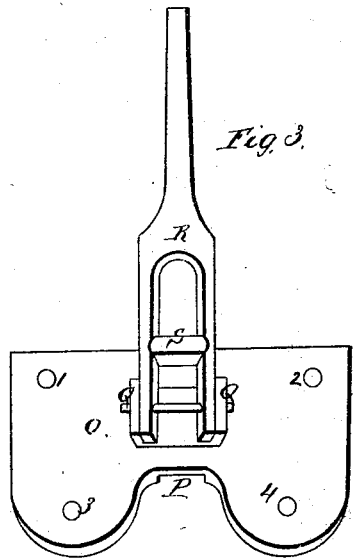
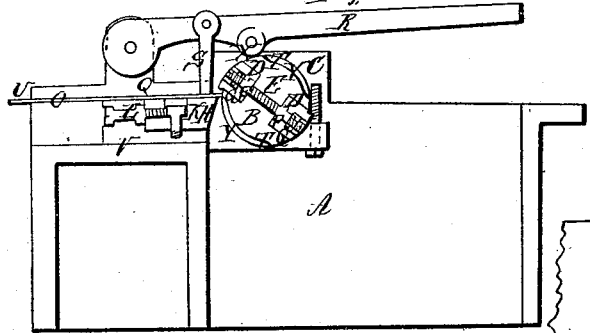
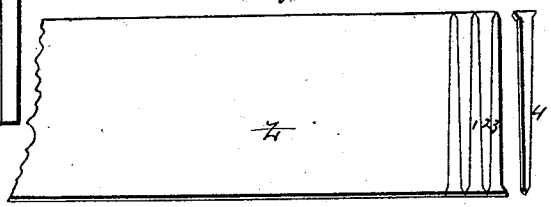
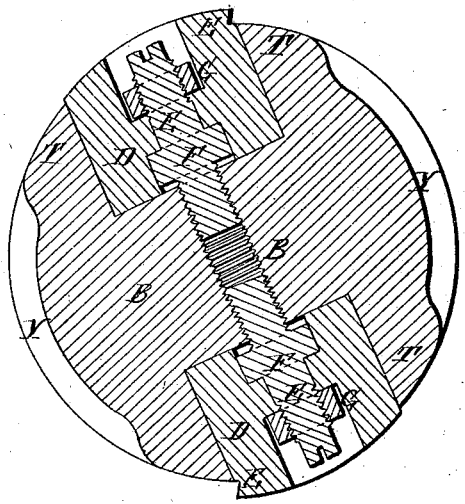
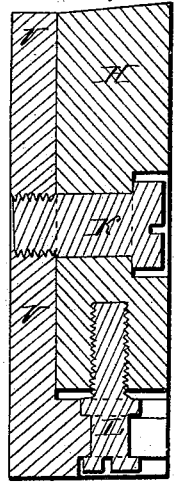
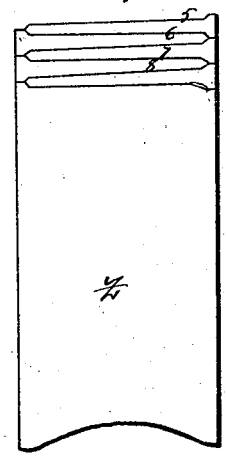

UNITED STATES PATENT OFFICE.

WALTER HUNT, OF NEW YORK, N. Y.

NAIL AND MACHINE FOR MAKING THE SAME.

Specification of Letters Patent No. 1,407, dated November 12, 1839.

*To all whom it may concern:*

Be it known that I, WALTER HUNT, of the city, county, and State of New York, have invented a new and useful Improvement in the Shape or Form of and Mode of Manufacturing Cut Nails, Brads, &c., and that the following is a full, true, and accurate description of the form of said nails, &c., and also of the machine for and mode of manufacturing the same.

The improvement in the form of said nails, brads, &c., consists in their being cut (from hoops or plates of iron) with blunt wedge-shaped points and dove tail, or wedge shaped heads, as shown in Figure 4, in the annexed drawings which also exhibits the nail plate, from which they are cut, alternately head, and point; see Nos. 1, 2, 3, 4, each intervening point being cut from between the projections which form one half of each head of the adjoining nails, which heads are separated on a line with the center, or edge, of the point of said intermediate nail.

The machine for the above purpose of cutting said nails, is constructed as follows: See the annexed drawings which are marked with the scale of dimensions over each. Fig. 1, letter A, is a strong cast iron frame, in the form of a right-angled oblong box, with a metal shaft B made to revolve in bearings C C upon the top of said frame A at right angles with, and near the center of the same. In the center of said shaft B midway between its said bearings, are inserted the two rotary cutters D D which are shown in Figs. 1 and 2, but more perfectly exhibited in an enlarged sectional view Fig. 5 D D. Said cutters are square blocks of steel, except their outer surfaces, and are fitted into mortises, cut into opposite sides of the said shaft, each about one-third of the way through the same, and are regulated and secured in their places by a strong screw E, which passes through the center of each into said shaft at B. Said screws are formed with a collar or ring made solid on the shaft of the same, at F which fits into a countersink, under the bottom of said cutters, while the upper end of the screw, or bolt, passes up through the center of the same, and receives a nut G upon the upper surface of the cutter, which is then let into a corresponding countersink in the top and somewhat below the surface of the same, as shown in said Fig. 5, letters G G which nut binds the cutters down upon the collar F as aforesaid, and by turning the screw F F in, or out, the cutters are raised, or depressed, and secured firm, by turning down the nuts G G as aforesaid.

Horizontally opposite to the shaft B are placed two bed-cutters H H arranged side by side upon a carriage I, which is made to vibrate laterally with the shaft B upon a platform, or bed V (see Figs. 6, 1 and 2,) which is cast solid with the frame A somewhat below, and forming about one third portion of its upper surface. On the back end of said carriage, it is extended into two arms J J, which are nicely fitted in corresponding slots in the sides of the frame A and which serve as guides to keep the said carriage steady in its vibrations. The aforesaid bed-cutters are fastened down to the carriage I by central screws K K and are adjusted by means of tail-screws L L, which are formed with indented or female collars, fitted into corresponding slots in the back of said carriage I as shown at L L Figs. 1 and 6 so that the cutters H H may be raised out by unscrewing K K and without altering or turning the said tail-screws, which are only moved, in the horizontal adjustment of the said bed-cutters. Near the outside of said bed-cutters are two steel guides M M the back ends of which are secured by screws or otherwise; firm in the carriage while the forward ends project and fit into zig-zag grooves or slots N N made around the shaft B turning alternately to the right, and left, on two opposite sides of the same, and upon the outsides of the rotary cutters D D aforesaid. By this arrangement, the vibrating motion of the carriage I and bed-cutters H H is produced; the impulse being given by the rotation of the shaft B so that the bed-cutters are alternately brought opposite to their respective mates, the rotary cutters D D as shown in Fig. 1. Over the carriage I is placed a top, or guide plate O as shown in the sectional drawings Figs. 2 and 3, the latter of which is detached from the frame A, upon which it is to be bolted through the holes 1, 2, 3, 4. Under the bottom of said guide-plate at P is a gage-slot through which the nail-plate Z is introduced directly on a line with the rotary cutters D D and upon a horizontal line with the surface of the bed cutters H H, which are flush and even with that of the said carriage I, to and in which the latter are secured.

Centrally upon the top-plate are two ears, or flanges Q Q between which is secured the end of a tilt-bar R, secured by a center bolt passing through the same, which tilt-bar R is forked at its acting end and passes lengthwise over the frame A and rotary cutters D D leaving room in the opening of the forks for said cutters to revolve in, free of contact with the same. Near the acting joint of said tilt-bar between the forks of the same hangs a pawl, or gate, upon a pin, or bolt, which passes through the forks of the said tilt-bar and upper end of said gate at S the bottom end of which passes down through a corresponding slot in the top-plate O. The object of this gate is to hold down the nail-plate (from which the nails are to be cut,) firm upon the bed-cutters H H at the times that the nails are being cut off by the rotary-cutters D D, (see Figs. 1, 2, 5,) which exhibits a profile view of this arrangement, showing at T T portions of the shaft which are left to operate as cams upon the under side of the tilt-bar at X and which raises the same a sufficient length of time for the nail plate Z to be forced forward by the hand of the operator, or otherwise, and is brought down again by its own or additional weight, (as the shaft B presents in its revolution, its indented portions at Y) and confines the nail-plate as aforesaid.

The form of my bed-cutters, which is shown in Figs. 6, 1, and 2, letters H H is a right angled, six sided slab of steel corresponding in width, with the length of the nail to be cut, about double, in length and one half of the same in its thickness. The outer ends of my rotary-cutters, are convex, nearly on the same curve with that which is described by the limits of their revolution, though somewhat raised at their cutting corners, as shown in Fig. 5 letters E E, which is an end view, of the shaft B cut off through their centers. The edges or cutting corners of both rotary and bed-cutters, are formed precisely similar to the lines of separation as shown between the nails 5, 6, 7, 8, in Fig. 7 and are made to match, in pairs, in the same manner as said nails are represented by said lines of separation, and alternately, a rotary cutter on one side of the shaft B, to one of the reciprocating cutters, and the opposite rotary, to the adjoining reciprocating cutter, H, successively.

The width of the nails, is regulated by the projection of the rotary cutters above the surface or periphery of the shaft B. Consequently the mode of using is confined simply to the rotation of the shaft B and the introduction of the nail-plate Z as before described.

The nature of motion, and of effect having been fully explained in the above, I deem a recapitulation thereof, entirely superfluous, neither do I consider it pertinent to my specification, or claims, to attempt a description of the various modes of manufacturing, or forms in which nails, and brads, have been wrought, or cut; although I am aware that brads have been cut from hoop, or plate iron; so as to make the head of one out of the metal left beyond the point of another, alternately, on opposite sides, and that the same have been made, by both rotary, and reciprocating machines, and that nails and spikes have been made with wedge shaped points and with pyramidal, or square counter-sunk heads, neither of which brads, spikes, nails, or machines for making the same are included in my claims; but What I do claim and desire to secure by Letters Patent, is—

1. The making of the two sides of the head of one nail out of the metal left by cutting the wedge shaped points of the nails on each side, as herein above described, and this I claim whether effected by the above described machine, or any other.

2. Also in the machine above described, I claim the shifting of the bed cutters, for the purpose, and in the manner therein set forth.

In testimony whereof I have hereunto subscribed my hand, this 14th day of Oct. 1839.

WALTER HUNT.

Witnesses:
 JOHN EBBITT,
 D. E. WHEELER.